(12) United States Patent
Koh et al.

(10) Patent No.: US 7,289,732 B2
(45) Date of Patent: Oct. 30, 2007

(54) BROADCAST/COMMUNICATION UNIFIED PASSIVE OPTICAL NETWORK SYSTEM

(75) Inventors: Jun-Ho Koh, Suwon-shi (KR); Kyong-Joon Chun, Seoul (KR); Byung-Chang Kang, Yongin-shi (KR); Yun-Je Oh, Yongin-shi (KR)

(73) Assignee: Samsung Electronics Co., Ltd., Yeongtong-Gu, Suwon-Si, Gyeonggi-Do (KR)

( * ) Notice: Subject to any disclaimer, the term of this patent is extended or adjusted under 35 U.S.C. 154(b) by 626 days.

(21) Appl. No.: 10/621,588

(22) Filed: Jul. 17, 2003

(65) Prior Publication Data

US 2004/0022536 A1 Feb. 5, 2004

(30) Foreign Application Priority Data

Aug. 3, 2002 (KR) .............. 10-2002-0045995

(51) Int. Cl.
*H04J 14/00* (2006.01)
(52) U.S. Cl. .............. 398/75; 398/74; 398/66; 398/71; 398/72
(58) Field of Classification Search .............. 398/75
See application file for complete search history.

(56) References Cited

U.S. PATENT DOCUMENTS

| | | | |
|---|---|---|---|
| 5,343,314 A * | 8/1994 | Nakamura et al. ............. | 398/51 |
| 5,687,014 A * | 11/1997 | Czerwiec et al. ............. | 398/75 |
| 5,790,287 A * | 8/1998 | Darcie et al. ............... | 398/108 |
| 5,861,965 A * | 1/1999 | Koren et al. ................. | 398/75 |
| 5,911,019 A * | 6/1999 | Cohen ......................... | 385/24 |
| 5,912,749 A * | 6/1999 | Harstead et al. .............. | 398/75 |
| 6,385,366 B1 * | 5/2002 | Lin ............................. | 385/24 |
| 6,570,685 B1 * | 5/2003 | Fujita et al. ................. | 398/79 |
| 6,978,091 B1 * | 12/2005 | Needle ........................ | 398/72 |
| 2001/0030785 A1 * | 10/2001 | Pangrac et al. .............. | 359/125 |
| 2002/0145775 A1 * | 10/2002 | Effenberger et al. ......... | 359/123 |
| 2003/0099012 A1 * | 5/2003 | Kim et al. .................... | 359/123 |
| 2004/0042796 A1 * | 3/2004 | Con-Carolis et al. ......... | 398/83 |
| 2006/0141952 A1 * | 6/2006 | Kung et al. .................. | 455/102 |

FOREIGN PATENT DOCUMENTS

JP 10-209994 8/1998

* cited by examiner

*Primary Examiner*—Kenneth Vanderpuye
*Assistant Examiner*—Thi Q. Le
(74) *Attorney, Agent, or Firm*—Cha & Reiter, LLC

(57) ABSTRACT

Disclosed is a broadcast/communication unified passive optical network system. The network system comprises: an optical line termination that time-division multiplexes the received digital broadcast signals, receives communication signals through the internet, and wavelength-division multiplexes and transmits the broadcast signals and the communication signals; a plurality of optical network units connected to the optical line termination in one-to-multi connection, each optical network unit receiving the broadcast signals and the communication signals from the optical line termination, time-division demultiplexing the broadcast signals, and sending the broadcast signals selected from the above broadcast signals in accordance with a subscriber control signal and the communicating signals; and, a plurality of setup boxes connected to the each optical network unit in one-to-multi connection, each setup box receiving the broadcast signals and communication signals from each corresponding optical network unit and sending the subscriber control signal inputted by a subscriber to the corresponding optical network unit.

11 Claims, 7 Drawing Sheets

| CATV UP | M O D | ANALOG (60 CH) | DIGITAL (60 CH) | VOD/PPV | DATA BROADCAST | GAME AND INTERACTIVE | ISP ADDITIONAL BUSINESS |
|---|---|---|---|---|---|---|---|
| 42  65 88 | 108 | 450 | 612 | 744 | 750 | 802 | 852MHz |

FIG.2
(PRIOR ART)

BROADCAST/COMMUNICATION UNIFIED PASSIVE OPTICAL NETWORK SYSTEM

CLAIM OF PRIORITY

This application claims priority to an application entitled "BROACAST/COMMUNICATION UNIFIED PASSIVE OPTICAL NEWORK SYSTEM," filed in the Korean Intellectual Property Office on Aug. 3, 2002 and assigned Serial No. 2002-45995, the contents of which are hereby incorporated by reference.

BACKGROUND OF THE INVENTION

1. Field of the Invention

The present invention relates to an optical communication system and in particular to a passive optical network system.

2. Description of the Related Art

In order to construct a subscriber network from a central office to buildings and homes, various network constructions such as x-Digital Subscriber Line (xDSL), Hybrid Fiber Coax (HFC), Fiber To The Building (FTTB), Fiber To The Curb (FTTC), Fiber To The Home (FTTH) and schemes for enhancing them have been proposed.

Such FTTx (i.e., FTTB, FTTC and FTTH) can be implemented by active FTTx based on an Active Optical Network (AON) construction, or implemented by passive FTTx based on a Passive Optical Network (PON) construction. Passive optical networks have been proposed as an economic scheme for implementing an optical subscriber network for the future, due to the fact that it comprises a point-to-multipoint topology based on passive units.

The passive optical network is a subscriber network construction that connects one Optical Line Termination (OLT) to a plurality of Optical Network Units (ONU) by using a 1×N passive optical distributor, thereby forming a tree-structured distribution topology.

Currently, internet services including digital broadcast services and communication services such as Video On Demand (VOD) services are independently provided. Systems for digital broadcast services are designed for use in a broadcast network such as a Hybrid Fiber Coax (HFC) broadcast network or a Direct Broadcast Satellite (DBS) network. This separation of services is the result of the complicated and dedicated hardware apparatus that make up these respective systems. For example, a head-end and an optical line termination should be operated separately in order to provide broadcast and communication services, and sub-carrier analog transmission should be executed in order to transmit data to an optical network unit, in which case a complicated modulation mode is employed for increasing transmission efficiency. In addition, because in-house connecting networks are constructed using coaxial cable type, the transmission bandwidth is limited to about 900 MHz. Furthermore, with regard to broadcast networks, subscriber bandwidth utilization is unstructured and there are also associated limitations in transmission distance because a mode is employed in which all broadcast channels are transmitted to all of the subscribers. Although cable-modems are employed for use with the internet service receiving classes, there is a problem in that it is impossible to provide efficient bandwidth for increasing subscribers due to the fact that limited services are provided to the subscribers.

FIG. 1 shows a structure of a digital broadcast service system according to the prior art. A head-end 130 and an optical line termination 160 are shown. Digital broadcast signals are received at the head-end 130 from either a satellite antenna 110 or a Digital Media Center (DMC) 120. The digital broadcast signals may be in the form of an MPEG2 multi-program transport stream, which consists of a plurality of individual MPEG2 transport streams. The head-end 130 comprises a transport stream demultiplexer 140 and a plurality of local processors 150.

The transport stream demultiplexer 140 demultiplexes the MPEG2 multi-program transport stream into a plurality of MPEG2 transport streams.

The local processors 150 remultiplex the MPEG2 transport streams for the purpose of performing encoding processing, customer management processing or the like.

The optical line termination 160 consists of a plurality of quadrature amplitude modulators (QAM) 170, a plurality of frequency converters 180, a signal combiner 190 and an electric/optical (E/O) converter 200.

The quadrature amplitude modulators 170 change the phase and amplitude of carrier, thereby enabling high-speed digital transmission. The frequency converters 180 convert the frequency of an inputted signal into an intermediate frequency (IF). The RF combiner 190 multiplexes and thus outputs a plurality of inputted signals as one broadcast signal. The E/O converter 200 E/O converts and transmits the broadcast signals through an optical fiber. It is possible to employ a laser diode as the E/O converter 200, which outputs light having a predetermined wavelength.

The broadcast signals, which have been subjected to the E/O conversion, are provided to a plurality of optical network units (not shown) connected to the optical line termination 160 through the optical fiber 210.

FIG. 2 shows frequency band allocation of an HFC network of the prior art. As shown in the drawing, it will be appreciated that the transmission band width is limited to 825 MHz; because the frequency bandwidth for V OD, broadcast service, etc. is narrow, because there is difficulty in providing real VOD services, high-speed internet services or the like.

As can be seen, the following problems exist in providing communication services such as digital broadcast services, VOD services, internet services or the like in accordance with the prior art network.

i) Because digital broadcast services and communication services are individually and separately provided, use and management of resources are inefficient.

ii) The digital broadcast is adapted to an HFC network. Therefore, it is necessary to employ a complicated modulation mode such as 64-QAM and 256-QAMin order to enhance the transmission efficiency of the broadcast signals, which are sent from a satellite or a digital media center.

iii) The head-end and the optical line termination should be separately operated, and the sub-carrier analog optical transmission should be performed in order to transmit data to an optical network unit. However, because in-house connection networks are in the form of coaxial cable, there is a problem in that the transmission bandwidth is not more than about 900 MHz.

iv) Although there is a cable-modem type in communication service receiving classes, no efficient bandwidth can be provided for increasing subscribers because limited services are allocated to subscribers.

SUMMARY OF THE INVENTION

The present invention is directed to a passive optical network capable of unifying digital broadcast and internet activities.

According to one aspect, the broadcast/communication unified passive optical network of the invention comprises: an optical line termination (OLT) which time-division multiplexes received digital broadcast signals, receives communication signals through the internet, and wavelength-division multiplexes and transmits the received digital broadcast and communication signals; a plurality of optical network units (ONUs) which are connected to the OLT in a multi-to-one connection, each ONU receiving the broadcast signals and communication signals from the OLT, time-division demultiplexing the received broadcast signals, and transmitting one or more of the time-division demultiplexed broadcast signals selected from among the received broadcast signals in accordance with a subscriber control signal and the communicating signals; and, a plurality of setup boxes, the setup boxes connected to the ONUs in a multi-to-one connection arrangement each setup box receiving the time-division demultiplexed broadcast signals and communication signals from an associated optical network unit (ONU). The setup boxes further sending a subscriber control signal, inputted by a subscriber, to the associated ONU.

BRIEF DESCRIPTION OF THE DRAWINGS

The above features and advantages of the present invention will be more apparent from the following detailed description taken in conjunction with the accompanying drawings, in which:

FIG. 2 shows a frequency bandwidth allocation of a conventional HFC network in accordance with the prior art;

DETAILED DESCRIPTION OF THE PREFERRED EMBODIMENTS

Figure 1:
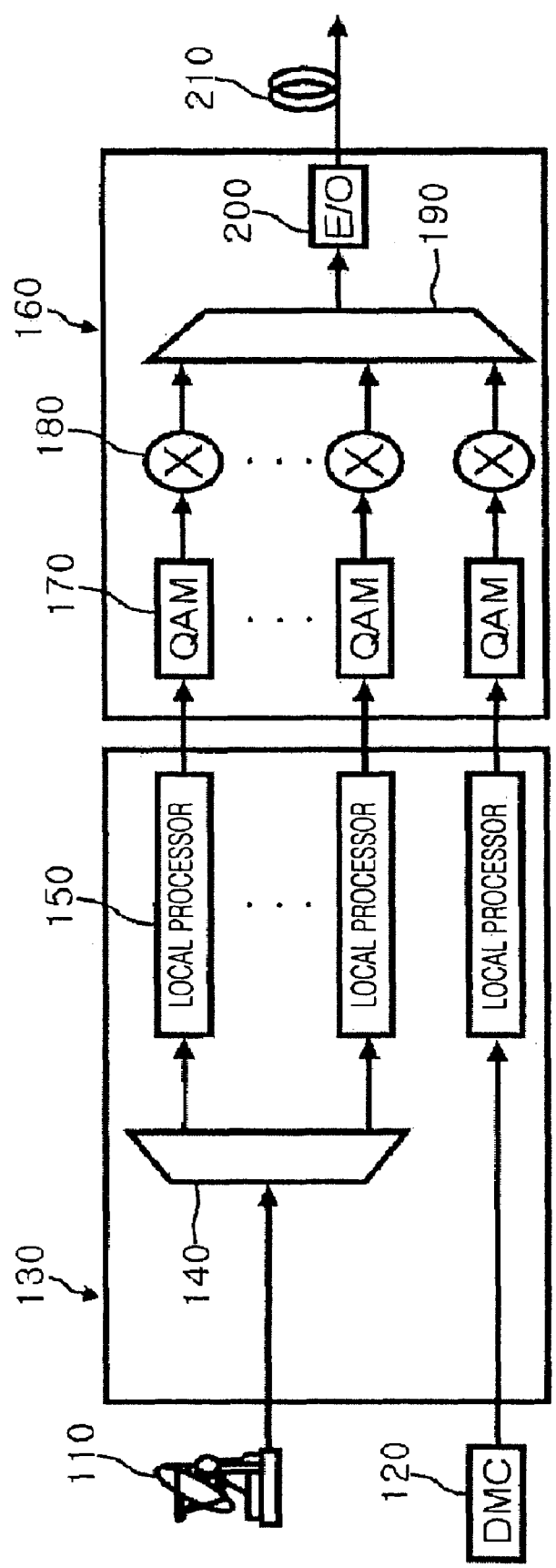
FIG. 1 shows a construction of a conventional digital broadcast system in accordance with the prior art.

Hereinafter, preferred embodiments of the present invention will be described in detail with reference to the accompanying drawings. It shall be noted that in the drawings, identical components are indicated by identical referential numerals and symbols. For the purposes of clarity and simplicity, a detailed description of known functions and configurations incorporated herein will be omitted as it may make the subject matter of the present invention unclear.

Figure 3:
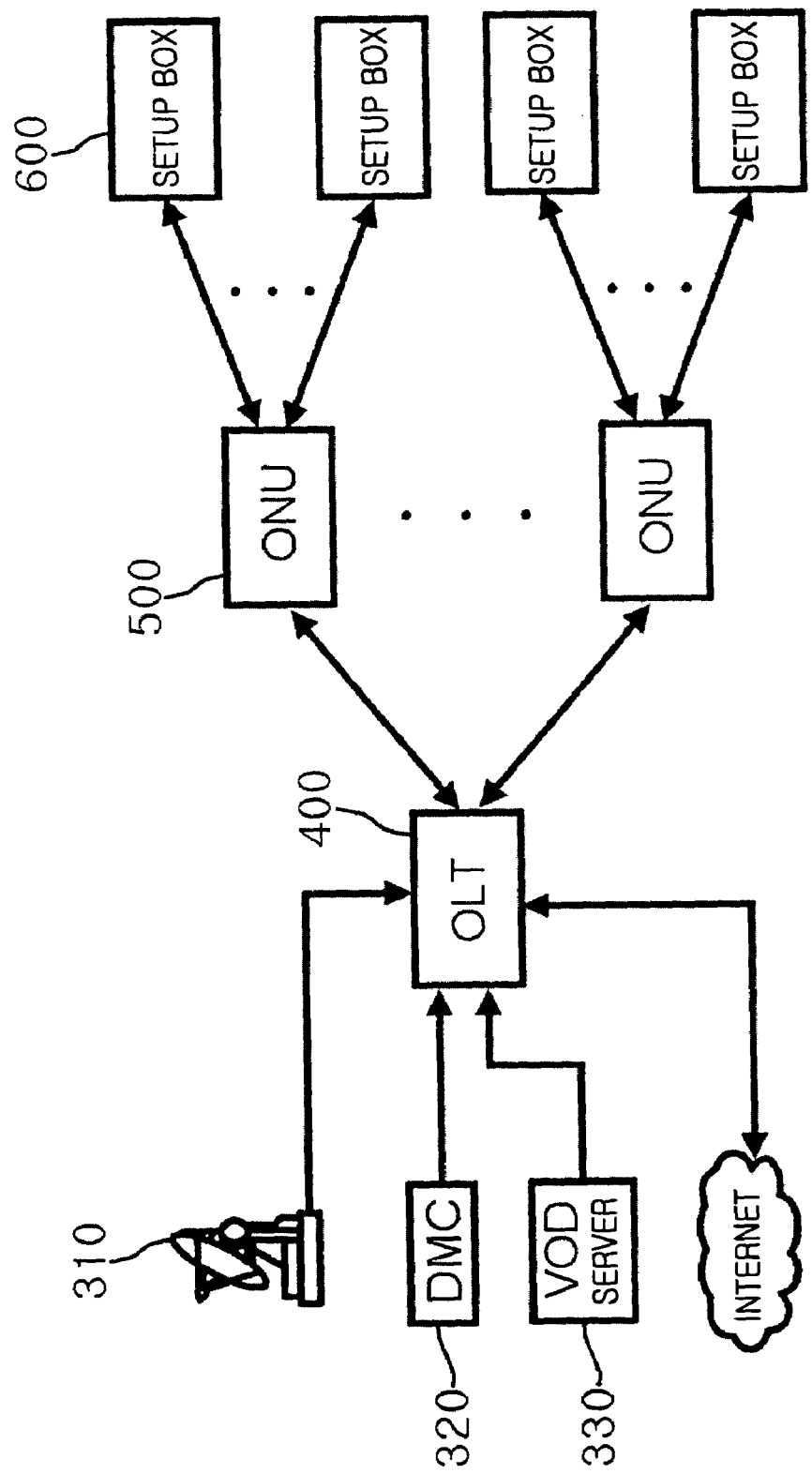
FIG. 3 shows a broadcast/communication unified passive optical network system in accordance with a preferred embodiment of the present invention.

FIG. 3 shows a block diagram of a broadcast/communication unified passive optical network in accordance with a preferred embodiment of the present invention.

An optical line termination ("OLT") device 400 communicates with a plurality of optical network units ("ONU") 500 via an optical fiber 480. The ONUs in turn communicate with a plurality of setup boxes 600.

The OLT 400 is connected to the Internet 340, a VOD server 330 to receive communication signals. The OLT 400 also receives digital broadcast signals from a satellite antenna 310 and a digital media center (DMC) 320. In the presently described embodiment, the digital signals are an MPEG2 multi-program transport stream.

Each of the plurality of ONUs 500 receives broadcast signals and communication signals from the OLT 400 and in turn re-transmits the broadcast and communication signals downstream to the setup boxes 600.

Additionally, the ONUs 500 receive communication signals from the setup boxes 600 and transmits the communication signals upstream to the OLT 400. Further, each set-up box 600 transmits a subscriber control signal provided by a subscriber to a corresponding ONU 500.

Figure 4:
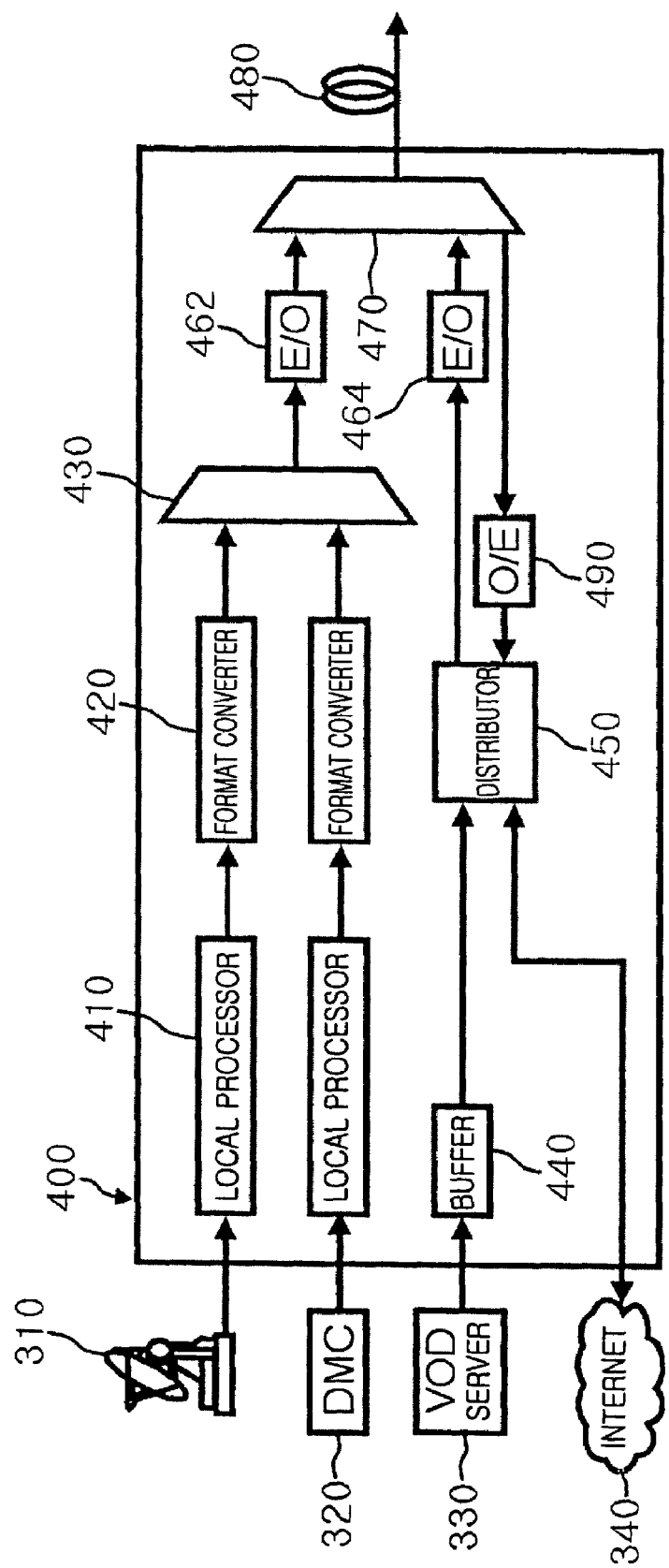
FIG. 4 shows a construction of the optical line termination shown in FIG. 3.

FIG. 4 shows an optical network unit (ONU) 400 in accordance with one embodiment of the present invention. The OLT 400 comprises first and second local processors 410, first and second format converter 420, a time-division multiplexer 430, a buffer 440, a distributor 450, first and second E/O converters 462 and 464, a wavelength-division multiplexer 470, and an O/E converter 490.

The first local processor 410 re-multiplexes an MPEG2 multi-program transport stream provided from the satellite antenna 310 for the purpose of performing encoding processing, subscriber management processing or the like. The second local processor 410 re-multiplexes an MPEG2 multi-program transport stream provided from the digital media center 320 for the purpose of performing encoding processing, subscriber management processing or the like. Generally, remultiplexing involves receiving one or more multiplexed or individual bitstreams as an input, extracting identified sub-components (e.g., stream of packets) from each input, and combining the extracted sub-components with other available bitstreams into a new output multiplexed bitstream (i.e., the remultiplexed data stream).

The first format converter 420 converts the remultiplexed digital broadcast signals provided from the first local processor 410, from a moving image format into a time division multiplexing (TDM) format, in accordance with the synchronous digital hierarchy/synchronous optical network (SDH/SONET) standard. The second format converter 420 converts the remultiplexed digital broadcast signals provided from the second local processor 410, from a moving image format into a time division multiplexing (TDM) format, in accordance with the synchronous digital hierarchy/synchronous optical network (SDH/SONET) standard. As is well known in the art, SDH/SONET is a standard for synchronous data transmission over an optical media.

The time-division multiplexer 430 time-division multiplexes and outputs the format-converted signals output from the first and second format converters 420.

The buffer 440 stores the signals inputted from the VOD server 330.

The distributor 450 sends communication signals received from the internet 340 and the VOD server 330 downstream (towards the setup boxes 600) and sends signals received from the optical network units (ONUs) 550 upstream to the Internet. The distributor 450 may be embodied as an ethernet switch or as an ethernet router The first E/O converter 462 E/O converts and outputs the broadcast signals inputted from the time-division multiplexer 430 and the second E/O converter 464 E/O converts and outputs the communication signals inputted from the distributor 450.

The wavelength-division multiplexer 470 transmits the broadcast signals (via E/O converter 462) and communication signals (via E/O converter 464) through an optical fiber 480 to the plurality of ONUs 500. In addition, the wavelength-division multiplexer 470 outputs the communication signals received from the optical fiber 480 to the distributor 450 via O/E converter 490.

Figure 5:
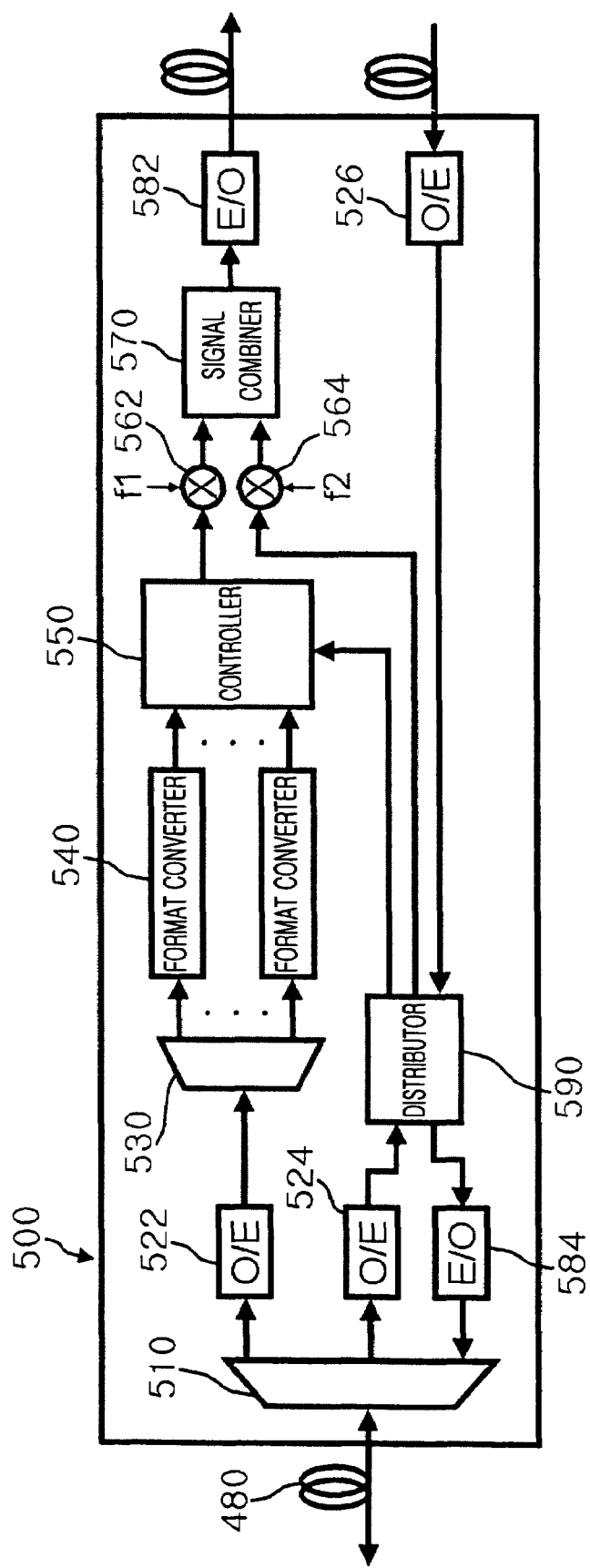
FIG. 5 shows a construction of the optical network unit shown in FIG. 3.

FIG. 5 shows an optical network unit (ONU) 500 in accordance with one embodiment of the invention. The ONU 500 comprises a wavelength-division multiplexer 510, a time-divisional multiplexer 530, a plurality of format converters 540, a controller 550, a distributor 590, first and second frequency converters 562 and 564, a signal combiner 570, first to third O/E converters 522, 524 and 526, and first and second E/O converters 582 and 584.

The wavelength-division multiplexer 510 demultiplexes the optical signals inputted through the optical fiber 480.

The first O/E converter 522 O/E converts and outputs the broadcast signals from among the demultiplexed optical signals outputted from the wavelength-division multiplexer 510, the second O/E converter 524 O/E converts and outputs the communication signals from among the demultiplexed optical signals provided from the wavelength-division multiplexer 510, and the third O/E converter 526 O/E converts and outputs the communication signals inputted through the optical fiber 480.

The time-division multiplexer 530 time-division demultiplexes and outputs the broadcast signals received from the first O/E converter 522.

The plurality of format converters 540 format-converts the broadcast signals from a TDM format into an MPEG2 multi-program transport stream (i.e., a moving image format) and outputs the format-converted broadcast signals.

The controller 550 is configured to select a single broadcast channel from among a plurality of broadcast channels provided from the respective plurality of format converters 540 in accordance with an subscriber control signal. That is, the controller outputs only the MPEG2 multi-program transport stream selected by the subscriber from among a plurality of MPEG2 multi-program transport streams. A Broadcast Selection Card (BSC) may be used as the controller 530.

The first frequency converter 562 upconverts the signal received from the controller 550 into a first (IF) intermediate frequency signal.

The distributor 590 is bi-directional and outputs the communication signals provided from the second O/E converter 524 to the second frequency converter 564. The distributor 590 also outputs the communication signals inputted from the third O/E converter 526 to the second E/O converter 584 if the communication signals are not subscriber control signals and outputs the communication signals provided from the third O/E converter 526 to the controller if the communication signals are subscriber control signals.

The second frequency converter 564 upconverts signals received from the distributor 590 into a second (IF) intermediate frequency signal.

The signal combiner 570 combines the first and second IF signals input respectively from the first and second frequency converters 562 and 564.

The first E/O converter 582 E/O converts and transmits the signals inputted from the signal combiner 570 through the optical fiber 481.

Figure 6:
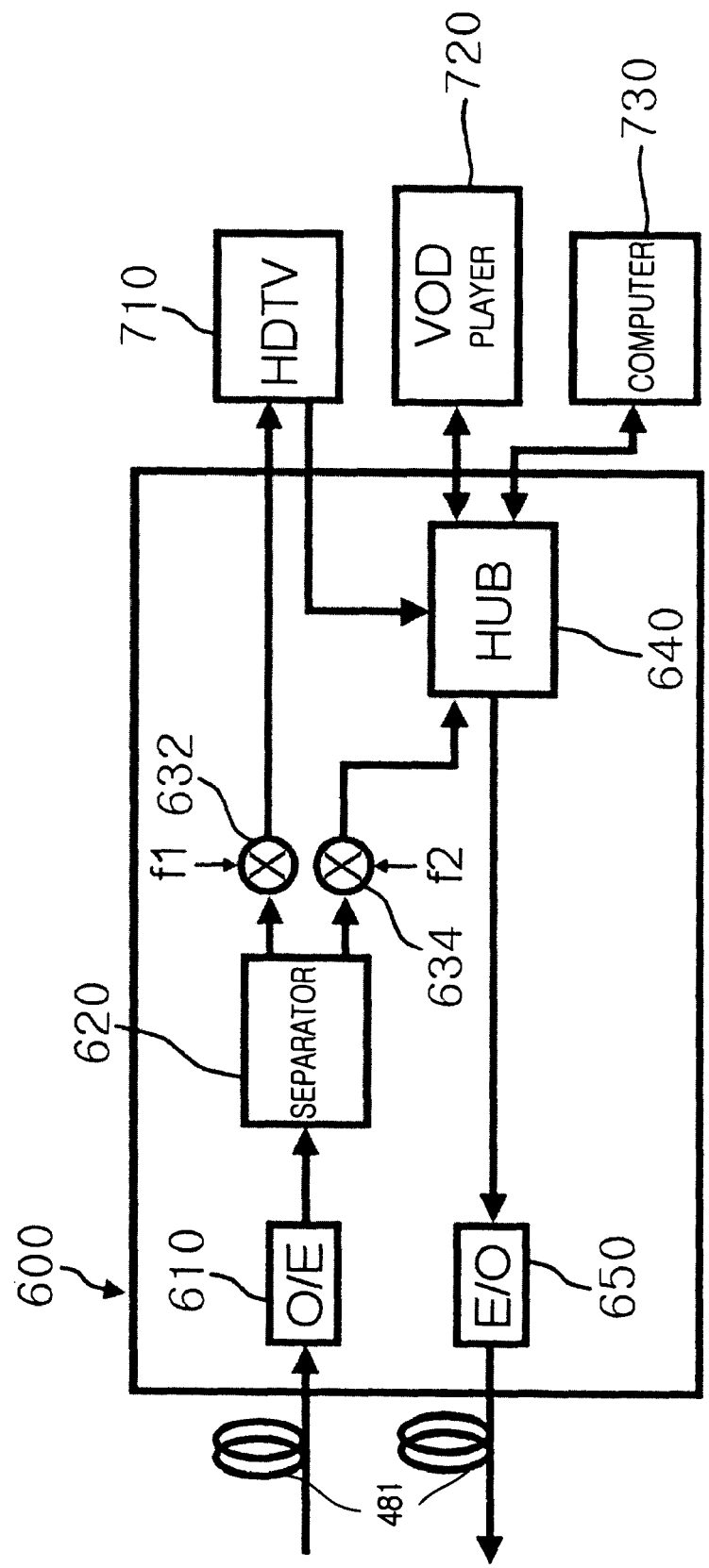
FIG. 6 shows a construction of the subscriber side setup box shown in FIG. 3; and, FIG. 7 shows a frequency bandwidth allocation of the broadcast/communication unified passive optical network in accordance with the present invention.

FIG. 6 shows a block diagram of a setup box 600 according to one embodiment of the present invention. The setup boxes 600 each comprise an O/E converter 610, an E/O converter 650, a signal separator 620, first and second frequency converters 632 and 634, and a hub 640. The setup boxes 600 are connected to a computer 730, a VOD player 720, and a high definition television (HDTV) 710, all of which are subscriber side terminals.

The O/E converter 610 O/E converts and outputs the signals inputted through the optical fiber 480.

The signal separator 620 outputs the signals inputted from the O/E converter 610 after separating the signals into broadcast signals and communication signals.

The first and second converters 632 and 634 downconverts the respective broadcast signals and communication signals from the IF band back to baseband signals. The recovered baseband broadcast signals are then inputted to the HDTV 710.

The hub 640 outputs the communication signals provided from the VOD player 720, the computer 730 and the HDTV 710 to the E/O converter 650, and outputs the communication signals provided from the second frequency converter 634 to the VOD player 720 or the computer 730. In the presently described embodiment, the HDTV 710 outputs a subscriber control signal for changing broadcast channels.

The E/O converter 650 transmits the inputted communication signals through the optical fiber 481 after E/O converting them.

Figure 7:
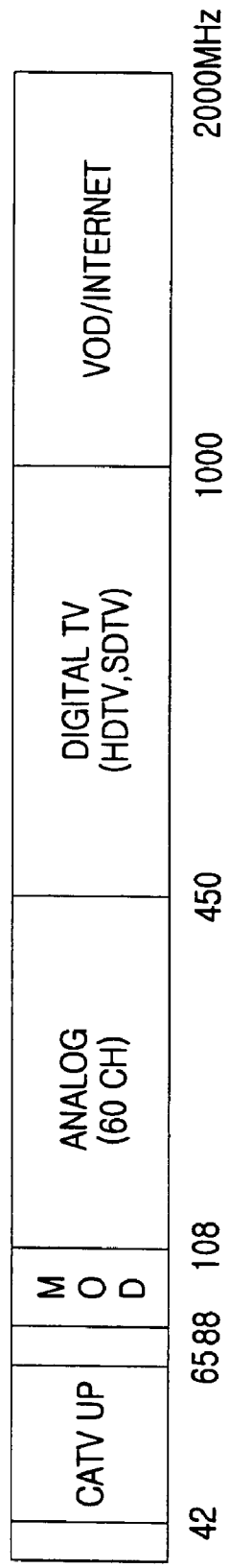

FIG. 7 shows a frequency bandwidth allocation of the broadcast/communication unified passive optical network in accordance with the present invention. It will be appreciated that the transmission bandwidth is extended up to 2000 MHz as compared to the prior art and a frequency bandwidth sufficient for a communication service or a digital broadcast service can be provided.

As can be seen, the broadcast/communication unified passive optical network system in accordance with the present invention has the following advantages:

i) It is possible to provide efficient services because a broadcast system and a communication system are unified.

ii) The broadcast signals are converted to have a format in accordance with SDH/SONET. Therefore, it is not required for the broadcast signals to be subjected to a complicated modulation process and the signals can flow through conventional SDH/SONET networks.

iii) It is bandwidth efficient because a subscriber may select a desired broadcast channel using a controller.

iv) Since a wavelength-division multiplexing mode is adopted, the limitation in bandwidth characteristic of the HFC network is relaxed. Therefore, it is possible to provide a high-speed service and adding optical channels can easily extend the bandwidth.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A broadcast/communication unified passive optical network system, comprising:

an optical line termination configured to time-division multiplex received digital broadcast signals, to receive communication signals from an electronic network, configured to wavelength-division multiplex the time-division multiplexed digital broadcast signals and the communication signals, and configured to transmit the wavelength-division multiplexed signals;

a plurality of optical network units coupled to the optical line termination, each of said optical network units configured to wavelength-division demultiplex the wavelength-division multiplexed signals received from the optical line termination, configured to time-division demultiplex the time-division multiplexed digital broadcast signals, and configured to output a subset of the time-division demultiplexed digital broadcast signals selected in accordance with a subscriber control signal and the communicating signals; and a plurality of setup boxes coupled to one of the plurality of optical network units, each of the plurality of setup boxes configured to receive the wavelength-division demultiplexed and time-division demultiplexed broadcast signals and the wavelength-division demultiplexed communication signals from corresponding optical network unit and configured to send subscriber control signals input by the subscriber to the corresponding optical network unit, wherein the optical line termination comprises: a first and a second format converter configured to format-convert the digital broadcast signals from a moving image format into a time-division multiplexing (TDM) format; a first time-division multiplexer configured to time-division multiplex the format-converted digital broadcast signals; a distributor configured to receive broadcast signals from the electronic network; and a first wavelength-division multiplexer being coupled to the first time-division multiplexer, being configured to wavelength-division multiplex the communication signals and the time-division multiplexed digital broadcast signals that is also format convened, and being configured to transmit the wavelength-division multiplexed signals to the optical network units over an optical fiber.

2. The system according to claim 1, wherein the received digital broadcast signals is an MPEG2 multi-program transport stream.

3. The system according to claim 1, wherein the electronic network is the Internet.

4. The system according to claim 3, wherein the TDM format is in accordance with a synchronous digital hierarchy/synchronous optical network (SDH/SONET) standard.

5. The system according to claim 1, wherein the optical line termination further comprises: a first and a second local processor configured to remultiplex the broadcast signals to the format converter; a buffer configured to store signals received from the VOD server; a first E/O converter configured to convert the format-converted digital broadcast signals provided from the time-division multiplexer; and a second E/O converter configured to convert the communication signals provided from the distributor.

6. The system according to claim 1, wherein each of the plurality of optical network units comprises:

a second wavelength-division multiplexer configured to wavelength-division demultiplex the signals received from the optical line termination;

a second time-division multiplexer configured to time-division demultiplex the demultiplexed broadcast signals;

a format converter configured to convert the broadcast signals having a time-division multiplexing format into a moving image format anti to output the format-converted signals;

a controller configured to transmit only the broadcast signals selected from the format-converted signals in accordance with a subscriber control signal to the setup boxes; and a distributor configured to output the subscriber control signal to the controller and to transmit the demultiplexed communication signals to the setup boxes.

7. The system according to claim 6, wherein each of the optical network units further comprises:

a first O/E converter configured to convert and output the digital broadcast signals among the demultiplexed optical signals provided from the second wavelength-division multiplexer;

a second O/E converter configured to convert and output the communication signals among the demultiplexed optical signals provided from the second wavelength-division multiplexer;

a third O/E converter configured to convert and output the communication signals inputted through the optical fiber;

a first frequency converter configured to output the signals provided from the controller after converting the frequency thereof into a first intermediate frequency signal;

a second frequency converter configured to output the signals inputted from the distributor after converting the frequency thereof into a second intermediate frequency signal;

a signal combiner configured to combine the signals provided from the first and second frequency converters; and a third E/O converter configured to convert the signals provided from the signal combiner through the optical fiber.

8. The system according to claim 1, wherein each of the setup boxes comprises:

a signal separator configured to separate the signals received over the optical fiber into broadcast signals and communication signals; and a hub configured to output the communication signals provided from one of a VOD player, a computer and an HDTV to a corresponding subscriber terminal, the hub further configured to receive communication signals including a subscriber control signal for changing broadcast channels from the subscriber terminal.

9. The system according to claim 8, wherein each of the setup boxes further comprises:

a fourth O/E converter configured to convert the signals provided from the optical fiber;

a first and a second frequency converter configured to downconvert the broadcast signals and the communication signals from an intermediate frequency to a baseband frequency; and a fourth E/O converter configured to E/O convert and transmit the communication signals through the optical fiber.

10. The system according to claim 1, wherein the optical line termination further comprises a first E/O converter directly coupled to the first time-division multiplexer and the first wavelength-division multiplexer.

11. The system according to claim 1, wherein the optical line termination is directly coupled to signal sources.

* * * * *